(12) United States Patent
Katz et al.

(10) Patent No.: US 6,172,349 B1
(45) Date of Patent: Jan. 9, 2001

(54) AUTOFOCUSING APPARATUS AND METHOD FOR HIGH RESOLUTION MICROSCOPE SYSTEM

(75) Inventors: Isaac Katz, Hadera; Michael Faeyrman, Kiryat Yam A'; Yehuda Elisha, Kfar Vradim; Shimon Kostianovsky, Haifa; Yoram Uziel; Joel L. Seligson, both of Misgav; Yoram Hanfling, Pardes Hanna, all of (IL)

(73) Assignee: KLA-Tencor Corporation, San Jose, CA (US)

( * ) Notice: Under 35 U.S.C. 154(b), the term of this patent shall be extended for 0 days.

(21) Appl. No.: 08/835,216

(22) Filed: Mar. 31, 1997

(51) Int. Cl.$^7$ .................................................. G01B 9/00
(52) U.S. Cl. ..................................... 250/201.3; 250/201.2
(58) Field of Search .............................. 250/201.3, 201.2, 250/201.1, 201.7, 201.8, 201.4, 208.1; 356/354, 358, 359, 360, 363, 376, 394, 400, 401; 348/79, 80

(56) References Cited

U.S. PATENT DOCUMENTS

| | | | |
|---|---|---|---|
| 4,340,306 | * | 7/1982 | Balasubramanian ............... 356/360 |
| 4,805,123 | * | 2/1989 | Specht et al. ..................... 382/144 |
| 4,818,110 | * | 4/1989 | Davidson ........................... 356/358 |
| 4,885,583 | * | 12/1989 | McCambridge ................... 341/100 |
| 5,112,129 | * | 5/1992 | Davidson et al. ................. 356/359 |
| 5,381,236 | * | 1/1995 | Morgan ............................. 356/376 |
| 5,438,413 | * | 8/1995 | Mazor et al. ...................... 356/363 |
| 5,557,097 | * | 9/1996 | Ortyn et al. ....................... 250/201.3 |

* cited by examiner

Primary Examiner—John R. Lee
(74) Attorney, Agent, or Firm—Carr & Ferrell LLP (57) ABSTRACT

A method and apparatus for automatically focusing a high resolution microscope, wherein during setup the operator designates areas within each field of view where a measurement will be taken, and for each area of interest translates the microscope along its optical axis (Z-axis) while measuring the image intensities at discrete subareas within the area of interest. These image intensities are then evaluated, and those having the greatest signal-to-noise ratio and occurring at a common point along the Z-axis will be selected, and the corresponding subareas identified. During subsequent inspections of the area of interest, only light reflected from the identified subareas will be used to focus the microscope. The invention has application in both conventional microscopy and interferometry.

30 Claims, 7 Drawing Sheets

AUTOFOCUSING APPARATUS AND METHOD FOR HIGH RESOLUTION MICROSCOPE SYSTEM

BACKGROUND OF THE INVENTION

1. Field of the Invention

The present invention relates generally to automatic optical focusing methods and more particularly to a method and apparatus for automatically focusing high magnification microscopes on selected areas of interest in a field of view.

2. Description of the Prior Art

In a number of semiconductor or similar applications very high magnification microscopes are used to achieve the required resolution. Because of the theoretical diffraction limit, the objective lenses of these microscopes must have very high NAs (numerical apertures), i.e. Nas close to 1. At these very high Nas, automatic focusing of the microscope is particularly challenging since the depth of focus is very narrow. The problem becomes particularly difficult when the specimen under examination has considerable topology, and when coherence techniques are used and the depth of focus is even smaller than for conventional microscopes.

In typical semiconductor applications, including the examination of magnetic heads, only certain parts of the field of view are of interest where a certain critical dimension must be measured at specified points of each die. These repetitive measurements are accomplished by setting up a measurement process on particular locations on a sample chip of a wafer and then by automatically replicating the process for the entire batch of wafers, each containing many chips and possibly many measurements on each chip. The automatic process includes driving the stage to the correct measurement location, focusing at the level where a measurement must be taken and making the measurement and storing the reading in the computer.

The autofocus system of the KLA 5000 Coherence Probe, made by the assignee of the present invention, uses a single photodiode covering ⅓ of the linear field of view to detect the coherence of light reflected from an area of a surface to be inspected. Scanning the image in the Z direction, i.e. along the optical axis, provides interference intensity information that is measured by the photo-diode and later on analyzed by software to determine the best focus. However, the capability of this method is limited to a relatively flat area of interest. In applications where the area of interest is not flat, phase cancellation will occur, resulting in no information on the photo-diode and, eventually, inability to find the focal plane of the area of interest.

Another method known in the prior art uses a bright-field-focusing apparatus. In this method, the contrast of the image is maximized. This system is limited by the depth of focus of the lens. The larger the NA (numerical aperture), the shorter the depth of focus. Also, another problem with this method is that in some instances the contrast of the image may be too small to achieve focus.

Yet another bright field focusing method is called triangulation. In this method a very narrow beam (usually produced by a laser) is projected at an angle on the object to be focused. The location of the reflected beam is detected by a photocell array. The reflected beam returns to a different location on the array, depending on the distance of the object from the light source. The disadvantage of this method is that the beam does not pass "through the lens" (TTL) and has limited resolution. Such a non-TTL method poses some offset problems as well as other mechanical adjustment problems. Also, the resolution is limited by the number of elements on the linear array.

U.S. Pat. No. 4,340,306 issued to Balasubramanian discloses an optical system for surface topography measurement. The disclosed system characterizes an unknown test surface with respect to a known reference surface by using a dual beam interferometer having one wavefront reflected from the unknown test surface of a test object, while the other beam has reference wavefronts reflected from the known reference surface of a reference object.

Point coincidences between a return point on the reference surface and a test point on the test surface are indicated by the two reflected beams having a zero path difference. An array of points on the test surface are measured by scanning the interference pattern, point by point, and recording contrast variations by means of a multi-apertured CCD detector, with a CCD aperture corresponding to each test point. If a maximum contrast level is observed by an aperture, then the test point corresponding to that aperture is recorded as having a zero path difference with respect to the reference point on the reference surface. That is, there is coincidence between the test and reference points.

The Balasubramanian device is used to determine the surface profile of an object. Consequently, it must utilize the output from every detector in the detector array in order to generate a high resolution comparison between the test and the reference surfaces. The Balasubramanian device considers every portion of a surface as it performs its measurements.

In some applications, such as overlay measurements, one may, in succession, focus on the same location but on two different layers of the wafer. Methods and apparatus known in the prior art, for automated high-volume operation, perform this refocusing in an extremely time-consuming manner.

Finally, high resolution devices of the prior art, especially those that use interferometry, are extremely vulnerable to vibration.

SUMMARY OF THE INVENTION

It is an object of the present invention to provide a method and apparatus for automatically focusing on an area of a wafer as measurements are taken of other areas of the wafer.

It is another object of the present invention to provide an additional optical channel for focusing on two different layers of the wafer.

It is yet another object of the present invention to provide techniques to mitigate the effects of vibration.

In the present invention, during the set-up, the operator designates the area within each field of view where the measurement has to be taken and also where the microscope is to be focused. These may be different areas because, although the measurement area must be in focus, an area may have too much topology to be used for automatic focus. In such instances an off-set method is used to focus on a suitable area in the same field of view, which is at the same height as the measurement area or at a height having a known difference from that of the measurement area. The manual designation of the optimal focus area during the set-up process can be replaced by having the system automatically select suitable areas for automatic focusing during the measurement phase of the operation. The present invention, therefore, provides a process that performs an automatic optimal area selection for automatic focusing in the field of view and describes a method for obtaining optimal focus at the designated location when the measurements are made. Once the designation of the optimal focus area is made, coherence measurements of the measurement areas are performed. In some wafer inspection applications, such as overlay measurements, one may, in succession, focus on the same location but on two different layers of the wafer. For automated high-volume operation, refocusing is too time-consuming. Therefore, one alternative embodiment of the present invention provides for an additional optical channel with its own camera. In this embodiment, the system includes two optical channels having different magnifications, so as to speed up operations where a rapid change of magnification is required.

High resolution devices, particularly those using interferometry, are extremely vulnerable to vibration. Therefore, another alternative embodiment of the present invention provides additional elements to mitigate the effects of vibration.

An advantage of the present invention is that it provides a method and apparatus for performing high resolution measurements of certain surface areas of a wafer while automatically focusing on another designated area of the wafer.

Another advantage of the present invention is that it provides a method and apparatus for performing high resolution measurements of surface areas of a wafer wherein the effects of vibration are mitigated.

Still another advantage of the present invention is that it provides a method and apparatus for performing high resolution measurements of certain areas on a wafer while automatically focusing on the same or a different designated area of the wafer but at different layers of the wafer.

These and other objects and advantages of the present invention will no doubt become apparent to those skilled in the art after having read the following detailed description of the preferred embodiments which are illustrated in the several figures of the drawing.

DETAILED DESCRIPTION OF THE PREFERRED EMBODIMENTS

Figure 1:
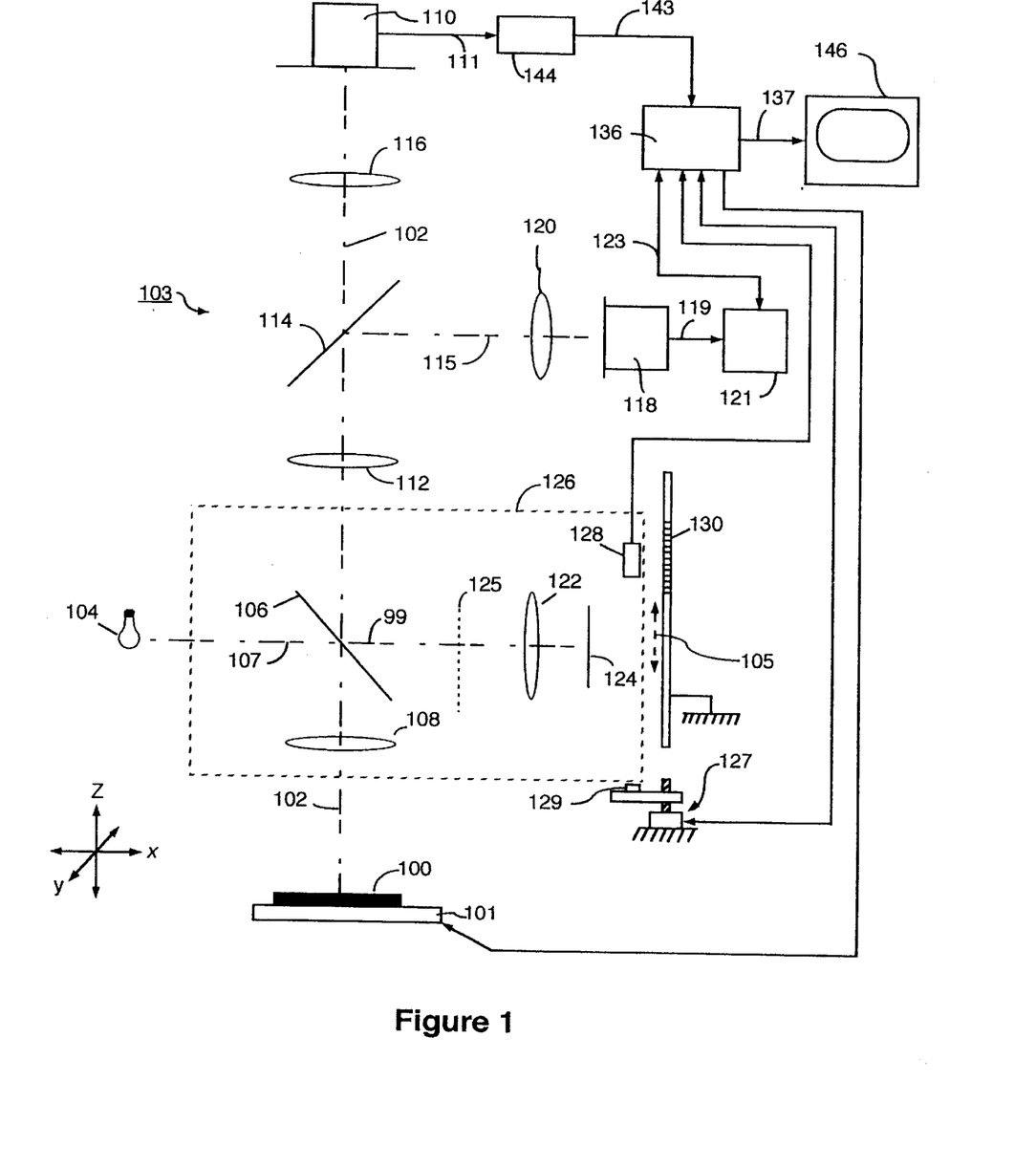
FIG. 1 schematically illustrates a coherence microscope system having a pin diode detector array in accordance with the present invention.

FIG. 1 is a schematic representation of an improved coherence microscope system 103 having an autofocusing feature in accordance with the present invention. Some, but not all portions of the coherence microscope system 103 of the present invention are described in U.S. Pat. No. 4,818,110 which is assigned to the assignee of the present invention, and which is incorporated by reference herein. As depicted in the drawing, a specimen 100 is disposed on a computer-controlled motorized and metered x-y stage 101 and is mounted so as to lie perpendicular to a main optical axis 102 of the microscope system. A light source 104 provides a beam of broadband illumination which impinges on the specimen 100 via a beam splitter 106 and an objective lens 108. The light reflected by the specimen 100 travels to a camera 110 via objective lens 108, beam splitter 106, an intermediate lens 112, a beam splitter 114, and a lens 116 which forms a magnified image of the specimen 100 on the focal plane of the camera 110. The camera 110 generates video data, corresponding to the inspected surface area of the wafer 100, which is transmitted, via a line 111, to a video A/D unit 144. Digitized video data generated by the unit 144 is transmitted, via a line 143, to a computer 136.

Part of the light reflected from the specimen 100 is split off by the beam splitter 114 and directed along a secondary path 115 and imaged onto a pin diode detector array 118 by a lens 120. To allow the system to function as a Linnik microscope, a reference light path 99 which is colinear with the source beam path 107 and which by means of beam splitters 106 and 114 provides a reference wavefront to both the camera 110 and the pin diode array 118. The reference path 99 includes a lens 122 and a planar mirror 124. The path 99 may be blocked by a shutter 125. When the shutter 125 is disposed so as to block the path 99, the system 103 functions as a conventional microscope.

Focusing of the microscope system 103 is performed by moving an assembly 126 of the previously mentioned vertically along the Z direction, i.e. along the direction indicated by the arrow 105. Under control of a computer 136, the assembly 126 is moved vertically by a motor and lead assembly (or other suitable means) 127 for macro-movements, and by a piezoelectric flexure, or the like, 129 for micro-movements. A sensor 128 is attached to the assembly 126 and measures the vertical movement of the assembly 126 with respect to a linear scale 130 which is stationary with respect to the specimen 100. The output of sensor 128 is fed to computer 136.

An analog output signal from the array 118 is transmitted, via a line 119, to an interface unit 121 which converts the analog signal to a digital signal. The digital signal is transmitted, via a line 123, to the computer 136. The digitized video or other computer generated images are output, via a line 137, to a display monitor 146.

Figure 2:
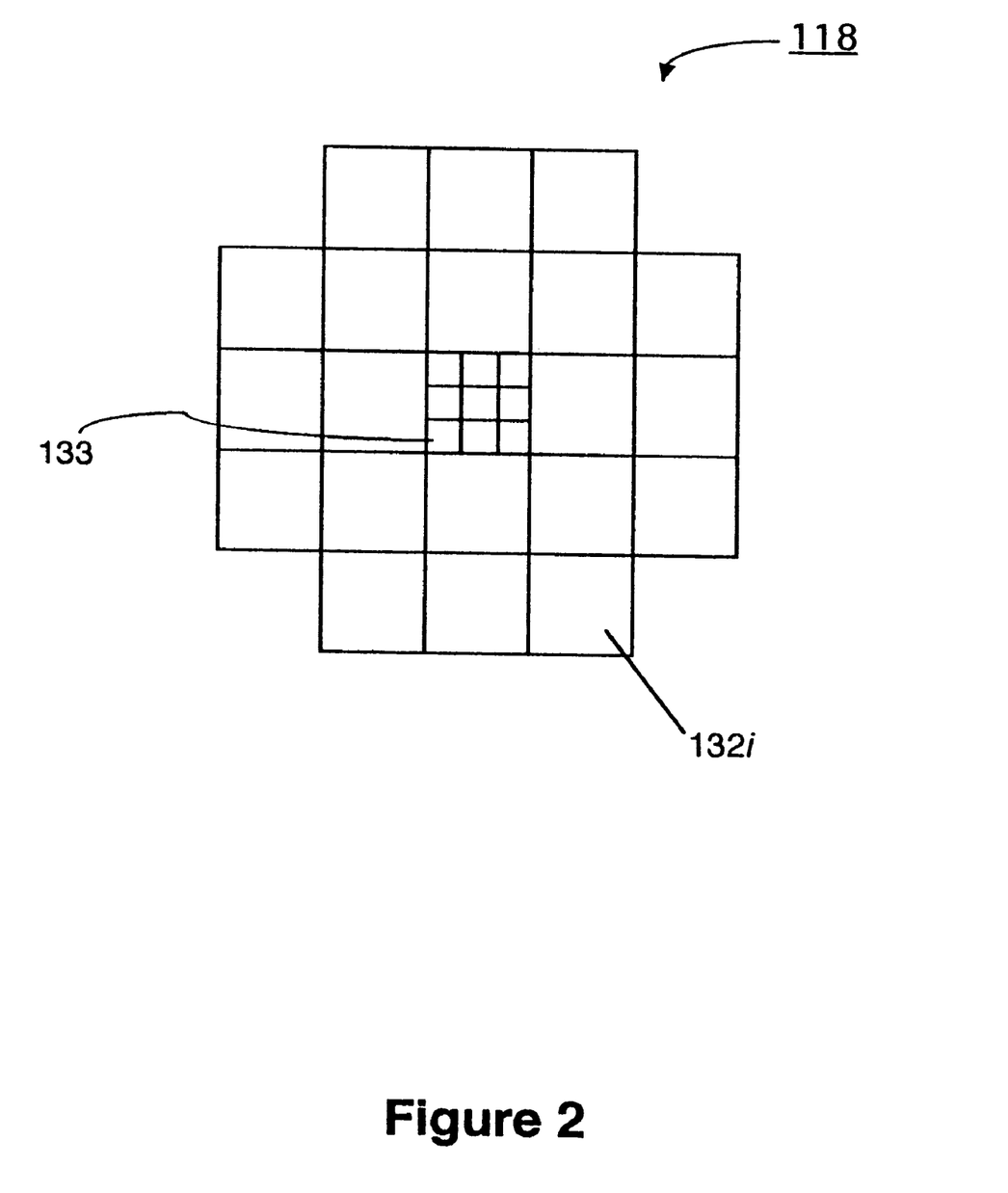
FIG. 2 schematically depicts the light responsive surface areas of the pin diode array shown in FIG. 1.

FIG. 2 illustrates one embodiment of the pin diode array 118 which may be obtained, for example, from Centronic Limited, Electro Optics Division, Centronic House, New Addington, Croydon CR90BG, United Kingdom. The detector array 118 includes a plurality of square shaped detectors 132 each having a separate electrical output that produces a current proportional to the energy impinging on the corresponding square. Each square is indicated by a numeral $132_i$, where i ranges from 1 to N, with N being the number of squares in the detector array 118. As depicted in the drawing, the square in the center of the array (and perhaps in other parts of the array as well) includes a subarray of detectors 133 having a much smaller "footprint" than that of the other detectors. This is to provide increased sensitivity in the corresponding portion of the area of interest.

Figure 3:
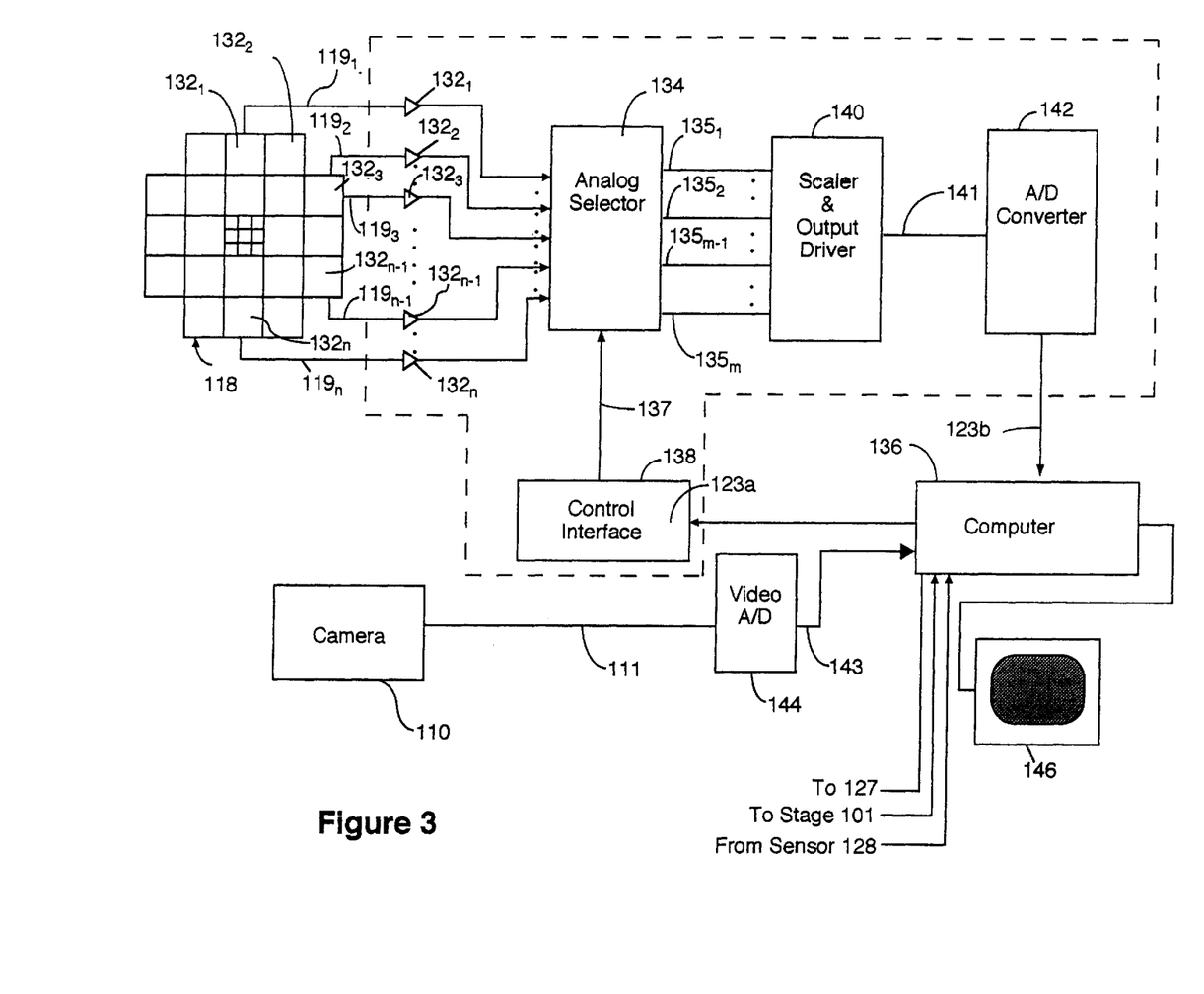
FIG. 3 is a block diagram illustrating means providing an interface between the pin diode detector array and the control computer depicted in FIG. 1.

FIG. 3 schematically depicts the functional components of the unit 121 that provides the interface between the detection array 118 and the computer 136. As partially shown in FIG. 3, an electrical signal is output from each square 132 of the array 118, with each square 132 representing a single photo-sensor or photo-diode that provides a signal which is communicated, via lines $119_1$–$119_N$ and pre-amplifiers $132_1$ to $132_N$, to an analog selector 134. The computer 136 selects, via a control interface 138, and lines 123a and 137, the particular detectors (i.e. squares $132_i$ of the array 118) that are to contribute to an input signal to a scaler and output driver unit 140. The input to the unit 140 is transmitted via lines $135_1$–$135_M$, where M is the number of detectors selected. Thus, any combination of photo-sensors or photo-diodes can be selected for processing by the computer 136.

The unit 140 is used to maintain the dynamic range of electronic output and to prevent device saturation. Because several detector outputs may be summed together, the total voltage may exceed the saturation voltage of the subsequent electronics. The unit 140 linearly reduces the summation weight of each photo-sensor selected for processing. Thus, if two photo-sensors are selected, their respective weights will be 0.5. If three photo-sensors are used, their respective weighting will be 0.333, etc. The total weighted sum of the selected detectors is kept at 1. However, the electronic circuit is not limited to this scheme of weighting the sums, and other weighting schemes may be used.

Unit 140 includes an output driver component (not shown) in the form of a low impedance amplifier through which an analog signal is transmitted, via a line 141, to the A/D converter 142. The digital signal from the converter 142 is input into the computer 136, via a line 123b. The video A/D 144 receives its input from the camera 100, and transmits the digitized video to the computer 136. The digitized video or computer generated images may then be displayed on the monitor 146. The computer can also superimpose on the image the pattern of detector array 118.

Figure 5:
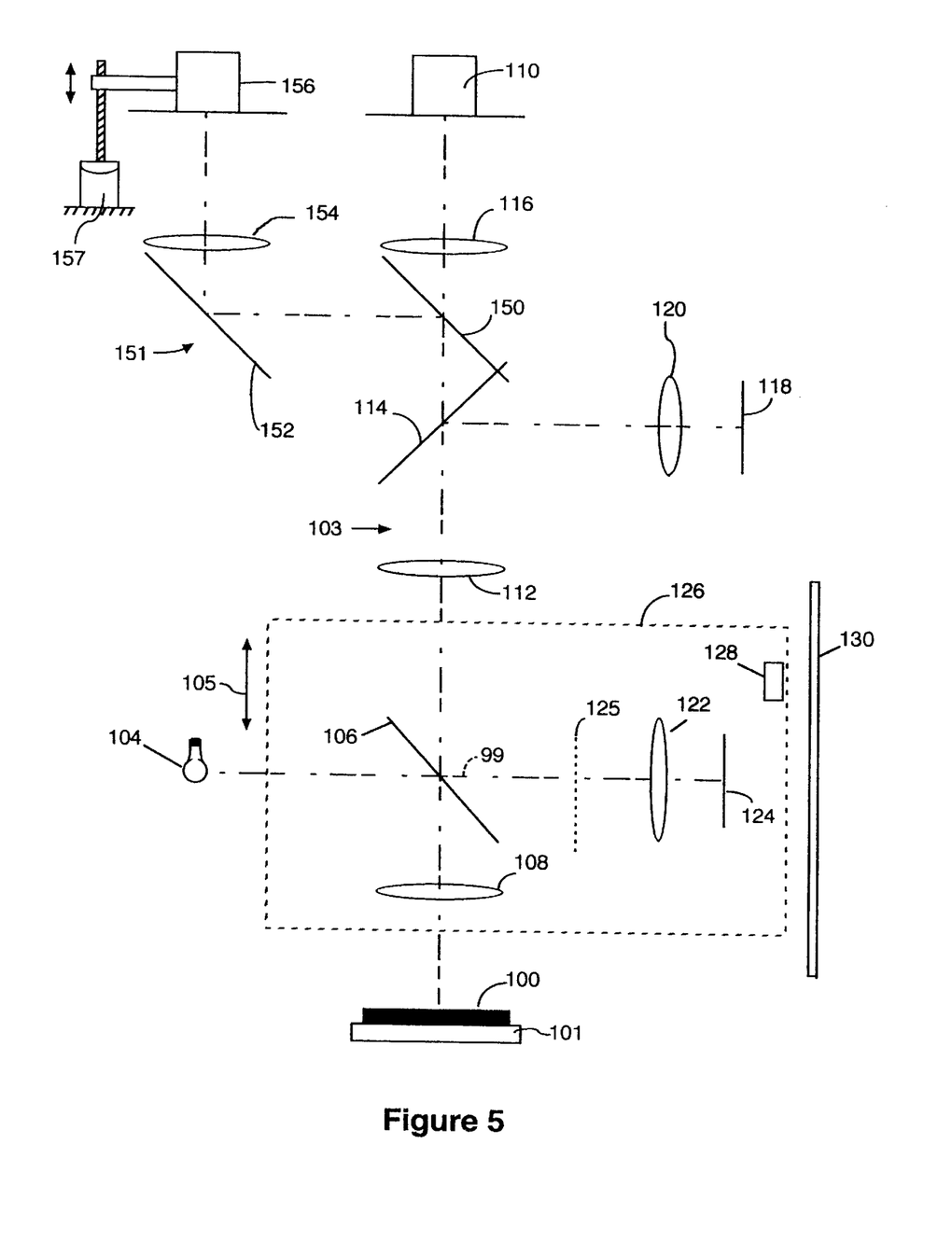
FIG. 5 illustrates an alternative dual camera embodiment of a coherence microscope of the present invention having a second optical channel.

An alternative embodiment of the interface unit 121 is depicted as unit 121' in FIG. 5. The unit 121' uses as many A/D converters 142' as there are detectors 132. In this embodiment each of the detector outputs are sampled via a multiplexer 143 forming the output stage of converter assembly 142'.

Vibration Mitigation

Due to the extreme sensitivity of the high resolution microscope systems to vibration, standard prior art techniques for reducing vibration may not be adequate. Two alternative embodiments of the present invention 103, as described below, include elements that improve the immunity of the system to vibration.

In the first alternative embodiment, the light source 104, ordinarily an incandescent bulb, is replaced with a Xenon flash lamp having a flash duration of less than 0.01 seconds. If the flash is synchronized with the vertical retrace of camera 110, there will not be any apparent tearing of the image due to vibrations. However, vibrations may cause successive frames to be slightly displaced with respect to each other, but this can be corrected by cross-correlating these frames with each other and determining and correcting for the shift in the memory of computer 136. The algorithms for detecting the shift, to a fractional pixel accuracy, and for correcting such shifts are described in U.S. Pat. No. 4,805,123 assigned to assignee of the present invention.

The Xenon flash technique may also be used to increase the throughput of the system because, in some cases, the stage can move continuously from measurement location-to-location. In this case the image can be acquired on-the-fly since the illumination is so short that image blur will not occur.

Another alternative embodiment that provides vibration mitigation uses a sensor (not shown) in the camera 110 that has a variable period for accepting the optical image, such as a COHU 4910 manufactured by Cohu Inc., Electronics Division, San Diego, Calif. The use of this embodiment is contingent on having sufficient light for the integration of the collected charge in the CCD sensor.

Dual Camera Mode

A typical overlay target on wafers has two levels which can be up to 2 microns apart, vertically. This separation is more than the depth of focus of the microscope objectives normally used, even when the microscope is operated in the conventional or non-interferometric mode. Presently, in the preferred embodiment, the stage slews to a measurement point and focuses at a first Z level, the system takes a measurement, and then slews to a second Z level. This slewing movement in the z-direction is relatively slow because of the settling time. However, the speed of the operation may be increased by adding another optical path having another camera. The second optical channel, shown at 151 in FIG. 5, is comprised of a beamsplitter 150, a mirror 152, a lens 154 and a camera 156. The camera 156 is moved along the Z-axis by means of a servo-driven motor 157 and a suitable drive linkage 158. In overlay measurements, the difference in the focusing level of the two cameras will remain the same for all measurements. Hence, camera 156 need not move with respect to camera 110 as the stage moves from one measurement area to another.

It is unlikely that cameras 156 and 110 can be adjusted mechanically so that their fields of view correspond to each other exactly, pixel-for-pixel. However it is possible to map or calibrate the disparity between the two channels and then correct for disparity in the computer in a manner as described on pages 12 through 15 of "Digital Picture Processing" by Azriel Rosenfeld and Avinash C. Kak, Academic Press, Inc., Second Edition, 1982.

Operation

Figure 4:
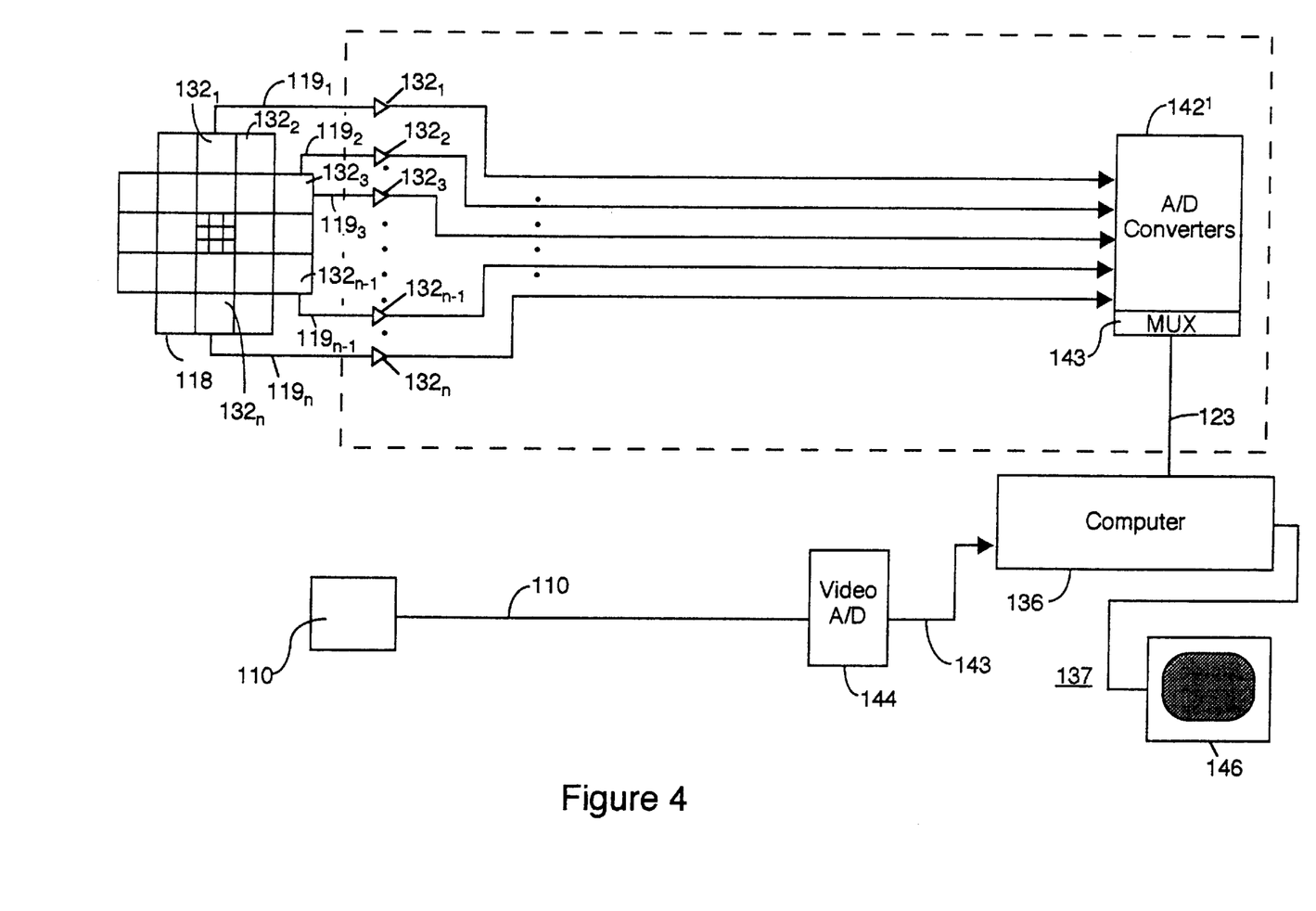
FIG. 4 schematically depicts an alternative embodiment of the means providing an interface between the pin diode detector array and the control computer depicted in FIG. 1.

During manual set-up operation, while the microscope 103 operates with the shutter 125 closed (i.e. the shutter 125 is disposed so as to block the optical path 99), the operator chooses a sample die on a wafer, manually focuses the microscope and locates a measurement point within a field of view. The operator then commands the computer 136 to read the x/y scales of the stage 101, and to store an image of the measurement point in memory. At the same time the operator designates, via a superimposed detector pattern shown on the display 146 (FIGS. 3 and 4), the diodes in the detector array 118 which cover an area where focus is to be achieved. In a similar manner, in other fields of view, other measurement points are located and memorized. Other focus areas are selected within the same field of view, and the appropriate detectors covering these other selected focus areas are designated.

After a set-up operation is completed, an automatic measurement operation can start. The shutter 125 is opened so as to unblock the optical path 99. On computer command, the first wafer to be measured is loaded on the stage 101. For a desired measurement point, the stage is driven to the pre-stored x/y scale position such that the desired measurement point is disposed coincident with the optical axis.

Once the stage is disposed at the pre-stored x/y scale position, the system attempts to acquire focus by using the outputs from each of the designated photo-sensors of the array 118. Specifically, the focus area is "in focus" if the coherence measurement computed from the output of the designated diodes is maximized. That is, the coherence values computed from the designated photo-sensor outputs should be substantially identical to the coherence values obtained during the set-up procedure.

If the focus area is "in focus", then the area of measurement, i.e. target of measurement, should be located on the optical axis, i.e. in the center of the image. The measurements of the target can be acquired by the computer and processed as taught by U.S. Pat. Nos. 4,818,110 and 5,112,129 and co-pending U.S. patent application Ser. No. 08/025,435 assigned to the assignee of the present invention.

In most cases focus is easily achieved. However, in some instances the stage, due to errors in the x/y measurements, may not be at the proper location. Therefore, the field of view designation, as referred to by the structures on the wafer, will be incorrect. Such an error makes it impossible to achieve focus.

To locate the proper focusing area, the stage is driven in a spiral search pattern, and at designated points the system automatically attempts to achieve focus. Once this is accomplished, the system tries to locate the targets of measurement. In the great majority of cases, the target will be close to the optical axis and to position it on the axis requires only a determination of the x/y off-sets by cross-correlating the reference image, acquired during set-up, with image seen by the camera. The stage is then driven to the right location. Should the target be outside the capture range of the cross-correlation calculations, a spiral search pattern is used again. In virtually all cases the spiral search will be successful. In some rare cases, refocusing may be required, as part of the search, if the topology is quite pronounced. Once the target for the measurement is located on the optical axis, i.e. in the center of the image, the proper image is acquired by the computer and processed as taught by U.S. Pat. Nos. 4,818,110 and 5,112,129 and co-pending application Ser. No. 08/025,435, now U.S. Pat. No. 5,438,413, assigned to the assignee of the present invention.

In some cases the area where the measurement is to be made exhibits too much topology. In such cases, the coherence may not be a good indicator of best focus. In this event, an offset process is used. During set-up a suitable flat site is selected for achieving focus. On the sample used during the set-up, the relative heights of the flat site and the measurement location are determined. Then, during the automatic measurement process, the system is focused on the flat site and the stage is moved to the measurement site and the microscope height is adjusted by the amount determined during set-up.

An alternate implementation of the invention is to use camera 110 both to acquire the image for focusing and to perform the measurements. In this alternative, the operator can view the image as stored in the computer and designate the area via a mouse where focus is to be achieved. The coherence function is then computed but only for the pixels of the designated area. In this implementation, beamsplitter 114, lens 120 and diode array 118 may be omitted. For this variation a "fast" camera should be used. A "fast" camera is a camera which can operate at a frame rate significantly greater than 30 Hz. If such a camera is not used, the amount of time required to detect focus will be considerable.

The above description illustrates the focusing method used for coherence microscopes. The present invention primarily relates to microscopes using Linnik interferometry, and is particularly useful in conjunction with all types of interference microscopes and techniques including that described by U.S. Pat. No. 4,818,110.

However, the concepts of the present invention can also be used, with some modifications, in conventional microscopes, i.e. microscopes not using interferometric techniques. Specifically, the same basic approach may be used with conventional microscopes, i.e., those equivalent to the system 103 having the shutter 125 closed. In that event the contrast, instead of coherence, is maximized. The operator designates a group of diodes, which "see" a bright (high reflectance) area of the target, and another group, which "tsee" a dark (low reflectance) area of the target. The signal from the first group is denoted by $S_{max}$, and from the second group by $S_{min}$. (These signals are measured for each diode relative to the dark-level output of that diode.) The contrast is then defined as:

$$\text{Contrast} = (S_{max} - S_{min})/(S_{max} + S_{min}).$$

Assembly 126 is driven vertically, and the best focus is deemed to occur where the contrast is at a maximum.

The system of the present invention is/substantially distinguishable from the device disclosed in the referenced Balasubramanian patent which uses a CCD array to provide a surface profile. Since a profile of the entire surface of the test object is required, all the apertures (i.e. sensors) of the array must be utilized in order to assure that no portions of the surface will be omitted from measurement. It is important to note that the device in Balasubramanian attempts to identify and measure all local irregularities in height that are present in the test object. In fact, it is these irregularities that are measured by the diode array in order to obtain a true indication of the accuracy of replication of the test object with respect to the reference object.

The system of the present invention, in contrast, uses the diode array in a secondary optical system to perform an autofocusing function in order that a primary optical system may be used to accurately inspect characteristics of the wafer. As such, only those areas of the wafer that facilitate focusing are selected, e.g. perhaps only flat sites of a certain height on the wafer will be selected. Consequently, while the array could perhaps cover an entire field of view, only a portion of the photo-sensors of the array will be designated. The system of the present invention essentially ignores areas of the wafer surface that can detract from the focusing operation, and is thus immune to detracting wafer features such as local irregularities in height.

Automatic Designation of a Focus Area

The set-up operation can be speeded up by automatically selecting the diodes corresponding to the area of interest. The method of automatically identifying the area of interest is described below.

Ordinarily several diodes cover an area suitable for focusing. The object is to designate all diodes that cover the area, so as to make the system more immune to local irregularities in height.

Figure 6:
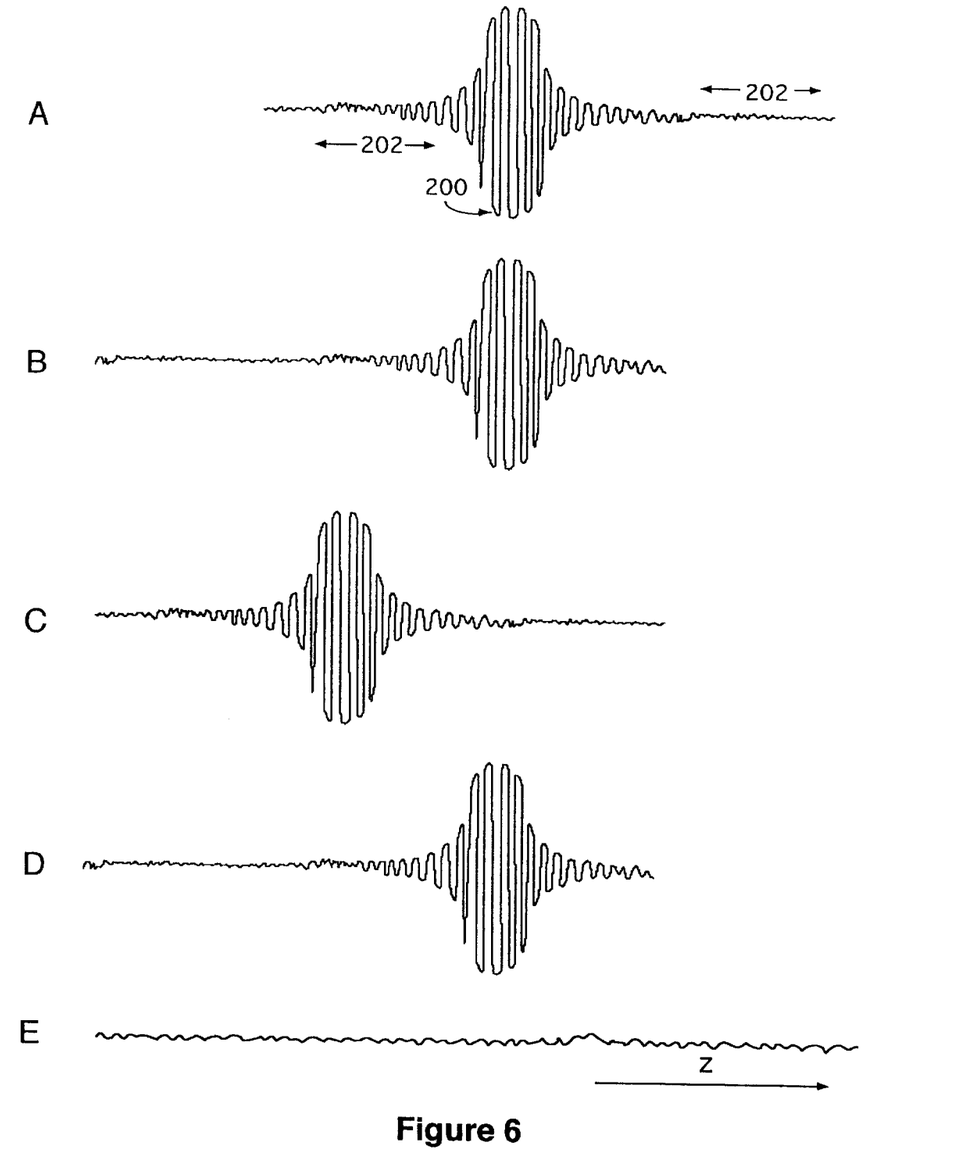
FIGS. 6A through 6E show typical waveforms of outputs from the pin diode detector array.

FIG. 6 illustrates typical waveforms or modulation envelopes of the diode outputs from array 118 while assembly 126 is moved vertically i.e., in the Z direction. Waveform A is a typical waveform for an area suitable for focusing because it exhibits a good signal-to-noise (S/N) ratio, i.e. the ratio of the maximum amplitude at location 200 to the rms value of the noise in region 202. In contrast, waveform E is clearly unsuitable because this envelope of the waveform has no sharp peaks. Waveforms A, B, C, and D have good signal-to-noise ratios and the diodes providing the outputs forming these waveforms are suitable candidates for selection.

The modulation envelope C, however, peaks at a different location in Z from the waveforms A, B and D. This disparity indicates that the regions covered by detectors producing waveforms A, B and D, are at different Z levels from the region covered by the detector producing waveform C.

Hence "mixing" the signals of the diodes producing the waveform C with those of the outputs from the diodes producing waveforms A, B and D would not result in a good focus. Thus, the diodes producing waveform C are not suitable candidates for selection.

Envelopes A and B peak at the same Z value but the waveforms are 180 degrees out of phase. This indicates that the detector producing one of the waveforms covers a surface region that is overlaid by a transparent substance, such as a photoresist. Adding waveforms A and B together would result in phase cancellation and therefore no optimum focal indication. However, the envelopes of B and D have simultaneous peaks and are in-phase. Therefore, these waveforms can be added together.

Figure 7:
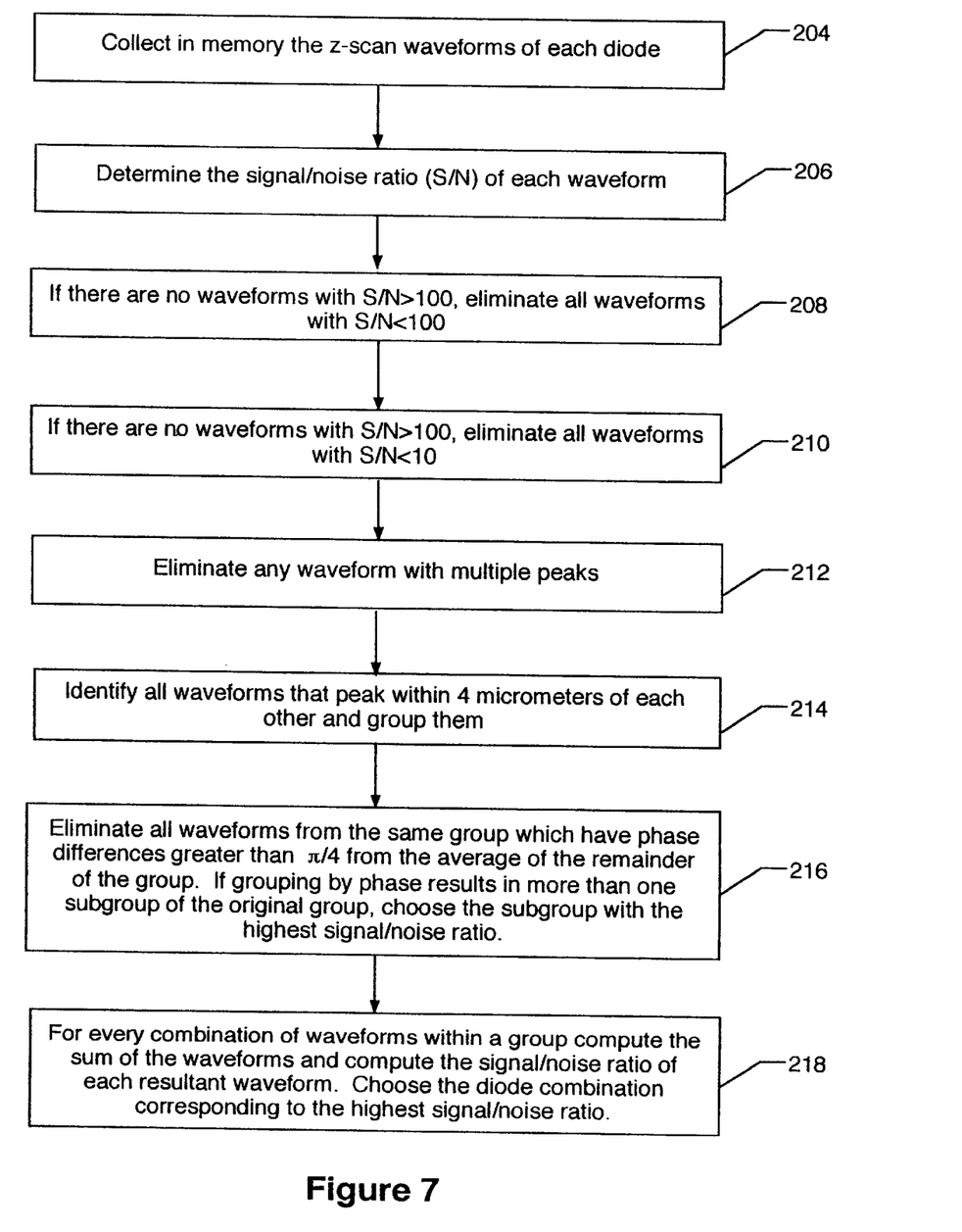
FIG. 7 is a flow chart depicting the sequence of operation for designating which diodes of the pin diode detector array are to be utilized in the focusing operation.

The previously explained process of selecting detectors is implemented in software and executed by the computer 136. The sequence of operations for automatically designating the detectors is depicted in FIG. 7.

In the step indicated at 204, a z-scan waveform output from each detector is collected. Specifically, the output from each diode is measured as the system scans or translates in the z direction away from the stage. Typical waveforms are illustrated in FIG. 6.

In the next step, as indicated at 206, the signal-to-noise (S/N) ratio of each waveform is determined using methods known in the art.

Next, at the steps indicated at 208 and 210, it is determined whether there are any waveforms having a S/N ratio greater than 100. If there are any such waveforms, then these waveforms are retained and all others (i.e. waveforms with S/N ratios less than 100) are eliminated. If, however, there are no waveforms with S/N ratios greater than 100, then all waveforms with S/N ratios greater than 10 are retained.

Of the remaining waveforms, waveforms having multiple peaks are eliminated in the step indicated at 212. A set of single peak waveforms remain for consideration after the completion of this step.

At the step indicated at 214, of the remaining single peak waveforms, those that peak within 4 micrometers of each other are identified and grouped into a plurality of waveform groups.

Next, in the step indicated at 216, within each group of waveforms, eliminate waveforms from the same group which have phase differences greater than w/4 from the average of the remainder of the group. If the grouping by phase results in more than one subgroup of the original group, choose the subgroup with the highest S/N ratio. The result of step 216 is several groups of waveforms, each within a phase difference of $\pi/4$.

At the step indicated at 218, for every combination of waveforms within a group compute the sum of the waveforms to generate a summed waveform for each group. Then, for each summed waveform, compute a summed waveform S/N ratio. Choose the diode combination that provides the highest signal/noise ratio.

For the dual camera option where measurements are to be taken at two different heights for the same x/y location, primary camera 100, the camera whose focus coincides with that of the diode array, is focused at the height of one target during set-up by moving assembly 126 appropriately. Then, while assembly 126 is held fixed, secondary camera 156 is focused at the level of the second target by moving the secondary camera along the Z-axis relative to the primary camera. These operations during the set-up adjust the relative focus levels of the two cameras to correspond to the levels needed in the subsequent automatic measurements. During the automatic measurement phase all targets have identical height differences. Therefore, if the primary camera is focused by driving assembly 126 vertically, this automatically ensures that the secondary camera will also be in focus on its target.

In some instances one may want to use the two cameras to acquire images at two different magnifications. This may be done by lenses 154 and 116 having two different focal lengths. While the present invention uses Linnik technology, the same principles apply equally to any other interferometric technique, such as Nomarski and Mirau microscopes.

Although the present invention has been described above in terms of a preferred and several alternative embodiments, it is anticipated that alterations and modifications thereof will no doubt become apparent to those skilled in the art. It is therefore intended that the following claims be interpreted as covering all such alterations and modifications as fall within the true spirit and scope of the invention.

What we claim is:

1. A method for automatically focusing a high resolution microscope, comprising the steps of:

during setup designating areas within each field of view where a measurement will be taken;

for each area of interest translating the microscope along its optical axis while measuring the image intensities at discrete subareas within the area of interest;

evaluating the intensities;

selecting those image intensities having the greatest signal-to-noise ratio and occurring at a common point along the optical axis and identifying the corresponding subareas; and during subsequent inspections of the area of interest, using only light reflected from the identified subareas to focus the microscope.

2. An apparatus for automatically focusing a high resolution microscope, comprising:

means for translating the microscope along its optical axis;

optical means for inspecting a multiplicity of subareas of an area of interest and for developing corresponding output signals indicative of the measured image intensities;

means for evaluating said output signals and for identifying those signals having the greatest signal-to-noise ratio and occurring at a common point along the optical axis; and means for storing the identified signals so that during subsequent inspections of the area of interest only light reflected from the identified subareas will be used to focus the microscope.

3. A method for automatically focusing a high resolution microscope relative to the surface of a specimen and having first means for inspecting characteristics of an object and having second means for performing an autofocus function, at least portions of said first and second means sharing a common optical axis, comprising the steps of:

during setup designating areas of interest within each field of view of said first means where a measurement is to be taken;

for each said area of interest, translating the microscope along said common optical axis while measuring, via said second means, the image intensities of discrete subareas within the area of interest;

evaluating the image intensities corresponding to each said subarea;

selecting those subareas having image intensities with the greatest signal-to-noise ratios occurring at common points along said common optical axis and identifying the corresponding subareas; and during subsequent inspections of the areas of interest using said first means, using said second means to detect only light reflected from the selected subareas corresponding to each said common point to focus the microscope.

4. A method as recited in claim 3 wherein said first means includes a first optical system and a video camera, said video camera being used to inspect light from each said area of interest.

5. A method as recited in claim 4 wherein said second means includes a second optical system and detector means including an array of light-responsive diodes, each said diode being used to detect the image intensity of a discrete subarea within said area of interest.

6. A method as recited in claim 5 wherein said array of light-responsive diodes is formed by a plurality of square-shaped diodes, each corresponding to one of said subareas and having a light-sensitive face and a separate electrical output producing a current proportional to the light impinging on its light-sensitive face.

7. A method as recited in claim 3 wherein said areas of interest are inspected during periods of less than approximately 0.01 second.

8. A method as recited in claim 7 wherein a shutter is used in said first optical system to determine the duration of each inspection period.

9. A method as recited in claim 7 wherein a flash lamp is used to determine the duration of each inspection period.

10. An apparatus for automatically focusing a high resolution microscope relative to the surface of a specimen, said microscope including first means for inspecting characteristics of an object, and second means for performing an autofocus function, at least portions of said first and second means sharing a common optical axis, comprising:

means for translating at least a portion of the microscope along said common optical axis; and wherein said second means includes optical means for inspecting and measuring the image intensity at various points along said common axis a plurality of subareas of an area of interest and for developing corresponding output signals indicative of the respective measured image intensities, means for evaluating said output signals and for identifying those output signals developed at each said point along said common axis having the greatest signal-to-noise ratios, and means for storing the identified signals so that, during subsequent inspections of the area of interest, only light from the identified subareas will be used to focus the microscope.

11. An apparatus as recited in claim 10 wherein said first means includes a first optical system having a first video camera for inspecting light from each said area of interest.

12. An apparatus as recited in claim 11 wherein said second means includes a second optical system having detector means including an array of light-responsive diodes.

13. An apparatus as recited in claim 12 wherein said array of light-responsive diodes is formed by a plurality of square-shaped diode devices, each corresponding to one of said subareas and having a light-sensitive face and a separate electrical output for producing a current proportional to the light impinging on its light-sensitive face.

14. An apparatus as recited in claim 13 wherein said first means further includes a second video camera having a predetermined focus offset relative to the focus of said first video camera along said common optical axis, said first and second video cameras being operative to simultaneously inspect different surface elevations of said specimen.

15. An apparatus as recited in claim 10 wherein said microscope is a coherence microscope and wherein the translated portion thereof includes a light source and a means for generating an interfering beam of light for interfering with the light collected from said sample.

16. An apparatus as recited in claim 10 wherein said means for translating is comprised of a motor and lead screw assembly for making macro-movements of said portion of said microscope, and a piezo-electric flexure for making micro-movements of said portion of said microscope.

17. An apparatus as recited in any of claims 10 through 16 wherein said areas of interest are inspected during periods of less than approximately 0.01 second.

18. An apparatus as recited in claim 14 wherein a shutter is used to determine the duration of each inspection period.

19. An apparatus as recited in claim 14 wherein a flash lamp is used to determine the duration of each inspection period.

20. A microscope for inspecting areas of interest on a specimen, comprising:

a first optical system for inspecting an area of interest of said specimen and for generating image data that can be electronically processed and used to indicate characteristics of said specimen;

a second optical system for inspecting a plurality of discrete subareas of said area of interest and for generating subarea signals corresponding to the image intensity of each said subarea, said first and second optical systems having at least portions thereof sharing a common optical axis;

means for moving the portions of said first and second optical systems sharing a common axis; and computer means for processing said image data and generating an output for driving an indicator means, said computer means being operative to evaluate said subarea signals and to identify those subarea signals having the greatest signal-to-noise ratios, the identified subareas being stored for subsequent comparison to previously stored signals, with the results of the comparison indicating the degree of focus of the microscope on the specimen.

21. A microscope as recited in claim 20 wherein the portions of said first and second optical systems sharing a common axis form the principal optical components of a Linnik microscope.

22. A microscope as recited in claim 20 wherein said first means includes a first optical system and a first video camera for inspecting light from each said area of interest.

23. A microscope as recited in claim 22 wherein said second means includes a second optical system and detector means including an array of light-responsive diodes.

24. A microscope as recited in claim 23 wherein said array of light-responsive diodes is formed by a plurality of square-shaped diode devices, each corresponding to one of said subareas and having a light-sensitive face and a separate electrical output for producing a current proportional to the light impinging on its light-sensitive face.

25. A microscope as recited in claim 20 wherein said areas of interest are inspected during periods of less than approximately 0.01 second.

26. A microscope as recited in claim 25 wherein a shutter is used in said first optical system to determine the duration of each inspection period.

27. A microscope as recited in claim 25 wherein a flash lamp is used to determine the duration of each inspection period.

28. A microscope as recited in claim 22 wherein said first means further includes a second video camera having a predetermined focus offset along said common optical axis, said first and second video cameras being operative to simultaneously inspect different surface elevations of said specimen.

29. A microscope as recited in claim 20 and further comprising stage means controlled by said computer means and operative to position said specimen relative to said common optical axis.

30. A microscope as recited in claim 29 wherein said means for moving includes a piezo-electric flexure controlled by said computer means.

* * * * *